Nov. 4, 1952 R. H. WHISLER, JR., ET AL 2,616,711
SHOCK ABSORBER VALVE
Filed Dec. 17, 1949
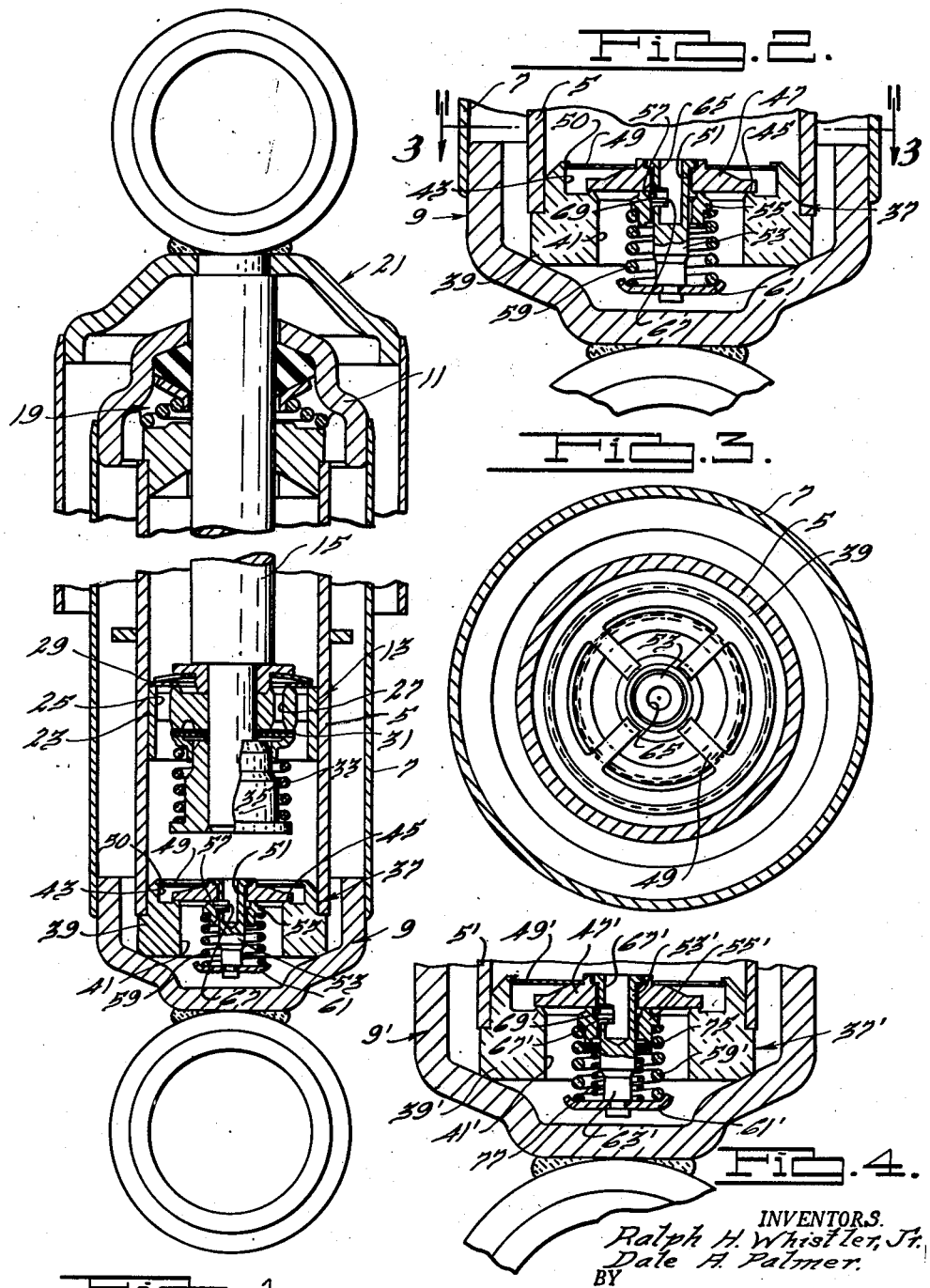
INVENTORS.
Ralph H. Whistler, Jr.
Dale A. Palmer.
BY
Harness, Dickey & Pierce.
ATTORNEYS.

Patented Nov. 4, 1952

2,616,711

UNITED STATES PATENT OFFICE 2,616,711

SHOCK ABSORBER VALVE

Ralph H. Whisler, Jr., and Dale A. Palmer, Monroe, Mich., assignors to Patent Development Company, Monroe, Mich., a partnership Application December 17, 1949, Serial No. 133,521

4 Claims. (Cl. 277—45)

This invention relates to shock absorbers, and more particularly to a novel base-compression valve assembly for controlling the flow of fluid between the pressure tube and reserve chamber of a hydraulic, direct-acting shock absorber.

It is an object of this invention to provide a base-compression valve assembly in a shock absorber which will reduce shock absorber cavitation.

It is a still further object of this invention to provide a base-compression valve assembly in a shock absorber in which no substantial shock absorber control losses will occur after the shock absorber has been used for a considerable length of time.

It is a still further object of this invention to provide a compression base valve assembly incorporating a static control valve which will prevent the fluid in the pressure tube and reserve chamber from seeking equal levels and thereby causing air to be present in the pressure tube when a device or vehicle to which a shock absorber is attached stands idle for a considerable period of time, and which may be used to meter the flow of fluid through an orifice to improve the operating characteristics of the shock absorber.

It is a still further object of this invention to provide a base-compression valve in a shock absorber which is extremely durable, efficient in operation and simple in construction.

These and other objects of this invention will become apparent from the following detailed description, taken in conjunction with the accompanying drawing, in which:

Figure 1 is a longitudinal sectional view of the shock absorber of this invention;

Fig. 2 is an enlarged fragmentary sectional view of the base-compression valve assembly of the shock absorber illustrated in Fig. 1;

Fig. 3 is a sectional view of the structure illustrated in Fig. 2 taken along the line 3—3 thereof; and Fig. 4 is a view similar to Fig. 2, illustrating a further embodiment of the invention.

Referring now to the drawing, it will be seen that the shock absorber includes, in a conventional manner, a pressure tube 5, reserve tube 7, reserve tube bottom and top closures 9 and 11 respectively. A piston assembly 13 is slidably mounted in the pressure tube 5 and has a piston rod 15 connected therewith and extending through a closure and seal assembly 19, in the upper end of the pressure tube and the reserve tube closure 11. A dust shield and tube assembly 21 is connected with the rod 15, in a conventional manner. The piston assembly 13 includes a body 23 having an outer set of circumferentially spaced passageways 25 and an inner set of circumferentially spaced passageways 27. The flow of fluid through the passageways 25 from the lower portion of the pressure cylinder to the upper portion thereof is controlled by means of a spring-loaded disk 29, while the flow of fluid through passageways 27 from the upper portion to the lower portion of the pressure cylinder is controlled by means of a laminated disk valve 31 loaded by means of spring 33 and a nut 35 which secures the piston assembly to the piston rod 15.

The bottom end of the pressure tube 5 is closed by means of a base-compression valve assembly 37, which includes a valve body 39, which is connected to the pressure tube 5 and engages the reserve tube bottom closure 9. The body 39 is provided with suitable recesses, openings or notches (not shown), which communicate the reserve chamber 7 with the under side of the valve body 39.

The body 39 is provided with a relatively large, vertically extending aperture 41 therethrough, which terminates at its upper end in a recess 43 provided in the top portion of the body 39. A land or valve seat 45 is provided around the aperture or opening 41 adjacent the bottom of the recess 43. A valve member 47 rests upon the circumferential land 45 and is resiliently held in engagement with the valve seat by means of a spoke-type flat spring 49. The inner ends of the spokes of the spring 49 engage the valve member 47, while the outer periphery of the spring 49 is disposed beneath a circumferential shoulder or rim 50, at the upper end of the valve body recess 43. The spring 49 acts to maintain the valve member 47 in its proper centered relationship with respect to the valve seat and resiliently maintains the valve member on the valve seat so as to normally prevent the flow of fluid from the reserve chamber to the pressure cylinder through the valve body passageway 41. It will, of course, be appreciated that the spring 49 is relatively light and flexible and permits the valve member to be easily raised from its seat, so that the pressure cylinder may be replenished upon upward movement of the piston assembly 13 therein.

The valve member 47 is provided with a vertically extending bore or opening 51 and a pin-like member 53 extends downwardly through the valve member 47 and is supported therein by engagement of the head of the pin in a recess at the upper end of the valve member bore 51. The bore 51 is of a larger diameter than the outside diameter of the pin 53, so as to provide a space or orifice to permit the flow of fluid therebetween. A valve element 55 is sleeved on the lower portion of the pin 53 and has a valve seat 57 on the upper face thereof, which is adapted to engage the under side of the valve member 47, for a reason which will hereinafter appear. The valve element 55 is resiliently held in engagement with the underside of the valve member 47 by a coil spring 59, the upper end of which engages the valve element 55 and the lower end of which engages a washer-like member 61, which is secured to the lower end of the pin 53, in any suitable manner. The inside diameter of the valve element 55 is larger than the outside diameter of the adjacent pin portion, so as to provide a space or orifice which will permit the flow of fluid from the pressure cylinder to the reserve chamber. The pin 53 is provided with a downwardly extending passageway 65 and with a horizontal slot 67 which communicates with the passageway 65 intermediate the ends thereof. The upper portion of the valve element 55 is recessed at 69 adjacent to the pin slot 67 so that fluid from the pressure cylinder can flow through the pin passageway 65 and slot 67 into the recess 69 in the valve element 55. When sufficient pressure has been built up in the pressure cylinder, during downward movement of the piston assembly 13, the valve element will be moved away from the bottom of the valve member 47, against the action of the coil spring 59, so as to permit the fluid to flow from the pressure cylinder to the reserve chamber. In this way control of the compression stroke of the shock absorber is obtained. It should be noted that the valve body passageway 41 is of a relatively large diameter and therefore cavitation in the shock absorber is reduced, as compared with conventional compression valves where the area of the opening is relatively small. Furthermore, control losses in this shock absorber are practically negligible because of the use of a coil spring in both the compression valve assembly and piston valve assembly, thereby increasing the life and efficiency of the shock absorber.

In the embodiment illustrated in Fig. 4, the compression valve assembly is substantially the same as that illustrated and described, with the exception that a static control valve is provided. Therefore, like parts of this embodiment will be indicated by primed numbers corresponding to like parts of the previous embodiment. In the embodiment illustrated in Fig. 4, a disk valve 75, either laminated or a single disk, engages the bottom face of the valve element 55', within the coil spring 59'. The laminated disk valve 75 is resiliently held in engagement with the bottom face of the valve element 55' by means of a relatively light coil spring 77, the upper end of which engages the bottom face of the laminated disk valve and the lower end of which is supported on the washer-like member 61'. The disk valve 75 normally closes the orifice, or space, between the outside diameter of the pin 53' and the inside diameter of the valve member 47' and valve element 55', against the flow of fluid from the pressure cylinder to the reserve chamber. The spring 77, however, is relatively light and is designed primarily to close the orifice only when the pressure of the fluid in the pressure cylinder is substantially atmospheric. The resistance of the spring 77 may, however, be increased, if desired, so that substantially more than atmospheric pressure is required to move disk 75 off of its seat. In this event, the spring does meter the orifice so as to reduce harshness on the compression stroke at relatively low piston velocities and fluid pressure. In either event, when the piston assembly 13 moves downwardly in the pressure cylinder, the disk valve 75 will move off of its valve seat to permit a flow of fluid through the orifice. The disk valve 75, therefore, acts as a static control valve and keeps the oil in the pressure tube and reserve tube from seeking an equal level, which would cause air in the pressure tube which would make the shock absorber noisy in operation and may be used to meter the orifice. It will be apparent that when the shock absorber, or a vehicle or other device on which one is mounted, stands idle for a long period of time, there is a natural tendency for the oil in the pressure and the reserve tubes to seek an equal level, thus causing an air pocket in the pressure tube which will cause unnecessary noise in the operation of the shock absorber after it is again used. The static control valve eliminates this possibility and thus assures quiet shock absorber operation, without affecting the operation of the orifice when the shock absorber is in use.

It will thus be seen that the base-compression valve assemblies illustrated and described in the embodiments of the invention are relatively simple in construction, inexpensive to manufacture and efficient in use, and will reduce shock absorber cavitation, increase the life of the shock absorber and eliminate shock absorber noise, in a manner not heretofore possible.

What is claimed is:

1. A compression valve assembly for controlling the flow of fluid between a pressure cylinder and a reserve chamber of a shock absorber, including a valve body having a passageway therethrough, a valve seat adjacent said passageway, a valve member for controlling the flow of fluid through said passageway in one direction, means for resiliently retaining said valve member in engagement with said valve body seat, means for controlling the flow of fluid through said valve assembly in the opposite direction, including a passageway through said valve member, a valve seat adjacent said valve member passageway, a valve element for controlling the flow of fluid through said valve member passageway, means for resiliently retaining said valve element in engagement with said valve member seat, means providing an orifice through said valve member and valve element, means providing a valve seat on said valve element adjacent one end of said orifice, resilient valve means normally engaging said last valve seat for controlling the flow of fluid through said orifice and preventing the flow of fluid through said orifice at least at substantially atmospheric pressures and permitting the flow of fluid therethrough at predeterminately higher pressures.

2. A compression valve assembly for controlling the flow of fluid between the pressure cylinder and reserve chamber of a shock absorber, including a valve body having a passageway therethrough, a valve seat adjacent said passageway, a valve member for controlling the flow of fluid through said passageway in one direction, means resiliently maintaining said valve member on said valve seat, means for controlling the flow of fluid through said valve assembly in the opposite direction, including a pin-like member supported by and having a portion extending through said valve member, said pin-like member having passageway means therein adapted to communicate with the pressure cylinder of the shock absorber and with said valve body passageway on the opposite side of said valve member, a valve element sleeved on said pin-like member portion and adapted to engage a surface of said valve member so as to control the flow of fluid through said pin-like member passageway means to said valve body passageway, means resiliently retaining said valve element in seating engagement with said valve member, means providing an orifice through said valve member and valve element, a valve seat on said valve element adjacent said orifice, and valve means engaging said valve seat and normally preventing the flow of fluid through said orifice, said valve means being adapted to be moved relative to said valve element seat by a relatively light fluid pressure so as to permit fluid to flow through said orifice.

3. A compression valve assembly for controlling the flow of fluid between the pressure cylinder and reserve chamber of a shock absorber, including passageway means, a valve member for controlling the flow of fluid through said passageway means in one direction, second passageway means in said valve assembly, a valve element for controlling the flow of fluid through said second passageway means in the opposite direction, and adapted to be actuated by a predetermined fluid pressure to permit a flow of fluid through said second passageway means, means providing an orifice through said valve assembly through which fluid may flow independently of said first and second passageway means, valve means for controlling the flow of fluid through said orifice means in one direction, to prevent the flow of fluid through said orifice means at least at substantially atmospheric pressures, and permit the flow of fluid therethrough at predeterminately higher pressures.

4. A compression valve assembly for controlling the flow of fluid between a pressure cylinder and a reserve chamber of a shock absorber, including a valve body having a central passageway therethrough, a valve seat surrounding said passageway, a valve member for controlling the flow of fluid through said passageway in one direction, a spring element connected with said valve body and with said valve member for resiliently retaining said valve member on said valve body seat, said valve member having a passageway therethrough, a pin-like member supported by and extending through said passageway, the outside diameter of said pin-like member being less than the inside diameter of said valve member passageway, so as to provide an orifice between said pin-like member and valve member, said pin-like member having passageway means therein adapted to communicate with the pressure cylinder of the shock absorber and with the valve body passageway, a valve element sleeved on said pin-like member and having a recess therein communicating with said pin-like member passageway means, the inside diameter of said valve element being greater than the outside diameter of said pin-like member so as to provide an orifice between said valve element and pin member, whereby an orifice is provided through said valve member and valve element, a washer-like element connected with said pin-like member adjacent the free end thereof, a coil spring disposed between said washer-like element and said valve element so as to resiliently retain said valve element in seating engagement with said valve member to control the flow of fluid through said pin-like member passageway and into said valve body passageway, a valve seat on said valve element and adjacent to said orifice, a disk-type valve engaging said valve element seat for controlling the flow of fluid through said orifice in one direction, and a coil spring disposed between said washer-like element and said laminated disk valve element for resiliently retaining said disk valve element on said valve element seat, said second coil spring being relatively light as compared with said first coil spring.

RALPH H. WHISLER, Jr.
DALE A. PALMER.

REFERENCES CITED

The following references are of record in the file of this patent:

UNITED STATES PATENTS

| Number | Name | Date |
| --- | --- | --- |
| 1,883,895 | Funston | Oct. 25, 1932 |
| 1,884,262 | Rossman | Oct. 25, 1932 |
| 1,991,043 | Bates | Feb. 12, 1935 |
| 2,159,289 | Nickelsen | May 23, 1939 |
| 2,428,451 | Emerson | Oct. 7, 1947 |